(12) United States Patent
Pan et al.

(10) Patent No.: US 6,657,346 B2
(45) Date of Patent: Dec. 2, 2003

(54) DEVICE FOR DETECTING THE ROTATING SPEED OF A FAN MOTOR

(76) Inventors: Huang Chuan Pan, No. 52, Alley 41, Lane 496, An-Ho Rd., Sec. 1, Tainan City (TW); Huang Chen Lung, No. 17, Hsin-Jen Rd., Tainan City (TW)

( * ) Notice: Subject to any disclaimer, the term of this patent is extended or adjusted under 35 U.S.C. 154(b) by 34 days.

(21) Appl. No.: 09/940,772

(22) Filed: Aug. 24, 2001

(65) Prior Publication Data

US 2003/0038550 A1 Feb. 27, 2003

(51) Int. Cl.[7] .............................................. H02K 11/00
(52) U.S. Cl. ...................... 310/99; 324/174; 324/207.2
(58) Field of Search ............................. 310/99, 58, 66; 324/174, 207.25, 207.2

(56) References Cited

U.S. PATENT DOCUMENTS

| | | | | |
|---|---|---|---|---|
| 5,046,867 A | * | 9/1991 | Hilby et al. ................. | 384/448 |
| 5,596,271 A | * | 1/1997 | Lowery ....................... | 324/174 |
| 5,783,924 A | * | 7/1998 | Kahlman .................... | 318/601 |
| 6,129,193 A | * | 10/2000 | Link ........................... | 192/84.1 |
| 6,337,524 B1 | * | 1/2002 | Lemperiere ................ | 310/75 R |
| 6,377,005 B1 | * | 4/2002 | Zintler et al. ............... | 318/9 |
| 6,400,278 B1 | * | 6/2002 | Weyerstall et al. ......... | 340/686.3 |
| 6,407,543 B1 | * | 6/2002 | Hagio et al. ............... | 324/207.25 |
| 6,448,760 B1 | * | 9/2002 | Neumann et al. .......... | 324/207.2 |
| 6,448,762 B1 | * | 9/2002 | Kono et al. ................ | 324/207.2 |
| 6,469,502 B2 | * | 10/2002 | Fischer et al. ............. | 324/207.2 |
| 6,483,296 B1 | * | 11/2002 | Hamaoka et al. ......... | 324/207.25 |

FOREIGN PATENT DOCUMENTS

| | | | | |
|---|---|---|---|---|
| DE | 4209205 A1 | * | 9/1993 | ............ G01B/7/30 |
| WO | WO 9859408 A1 | * | 12/1998 | ........... H02K/11/00 |

\* cited by examiner

Primary Examiner—Joseph Waks
(74) Attorney, Agent, or Firm—Pro-Techtor International Services

(57) ABSTRACT

A device for detecting the rotating speed of a fan motor includes a motor and a gear case fixed on the front side of the motor. Plural gears engaging with one another are provided in the gear case and one of them is embedded with a permanent magnet and further a magnetic inductive element is also installed inside the gear case to cooperate with the permanent magnet for operating together to detect the rotating speed of the motor.

1 Claim, 5 Drawing Sheets

DEVICE FOR DETECTING THE ROTATING SPEED OF A FAN MOTOR

BACKGROUND OF THE INVENTION

This invention relates to a device for detecting the rotating speed of a fan motor, particularly to one including a motor and a gear case secured in front of the motor and having plural gears engaged with one another inside, with one of them embedded with a permanent magnet, and also having a magnetic inductive element to cooperate with the permanent magnet for operating together to detect the rotating speed of the motor.

One conventional device for detecting the rotating speed of a motor shown in FIG. 1 has an encoder functioning as a light-controlling element at the rear side of a motor (A) to detect the rotating speed of the shaft of the motor (A). Another conventional device shown in FIG. 2 has a rotating disc B1 under the center shaft B0 of a motor (B) and a permanent magnet B10 fitted around the rotating disc B1. Thus, the magnet B10 cooperates with a magnetic inductive element B2 to operate together to detect the rotating speed of the motor.

Although two conventional devices mentioned above are available for detecting the rotating speed of a motor, yet the aforesaid encoder or a magnetic inductive element has to be installed at the rear side of the motor, thus not only complicating the structure of a motor, but increasing manufacturing cost as well. Besides, the aforesaid encoder is not suitable for provided in a gear case, which is filled with machine oil, otherwise operation cannot be carried on normally.

SUMMARY OF THE INVENTION

The objective of this invention is to offer a device for detecting the rotating speed of a fan motor, possible to facilitate its installing and to take less space.

The features of the invention are described below.

1. A permanent magnet respectively having a N pole and a S pole is embedded in any one of plural gears in the gear case connected with a motor and the permanent magnets together with a magnetic inductive element (such as hall effect element) positioned above it are activated to operate together by rotating of the gear to detect the rotating speed of the motor.

2. The magnetic inductive element (HALL IC is the best) of this invention is not affected by the machine oil in the gear case, always keeping a good operating condition.

BRIEF DESCRIPTION OF DRAWINGS

The invention will be better understood by referring to the accompanying drawings, wherein.

DETAILED DESCRIPTION OF THE PREFERRED EMBODIMENTS

Figure 1:
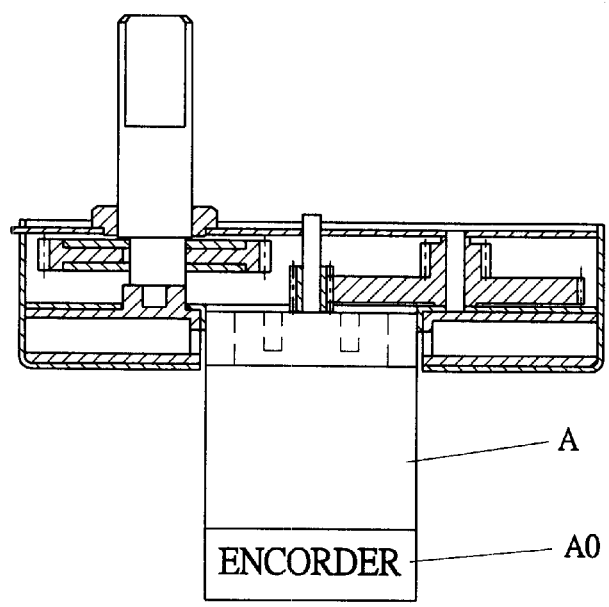
FIG. 1 is a cross-sectional view of a conventional device for detecting the rotating speed of a fan motor.
Figure 2:
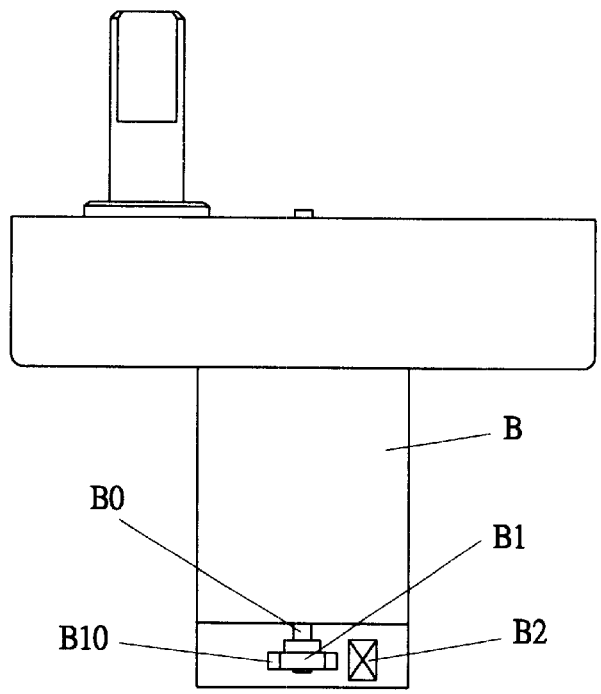
FIG. 2 is a cross-sectional view of another conventional device for detecting the rotating speed of a fan motor.
Figure 3:
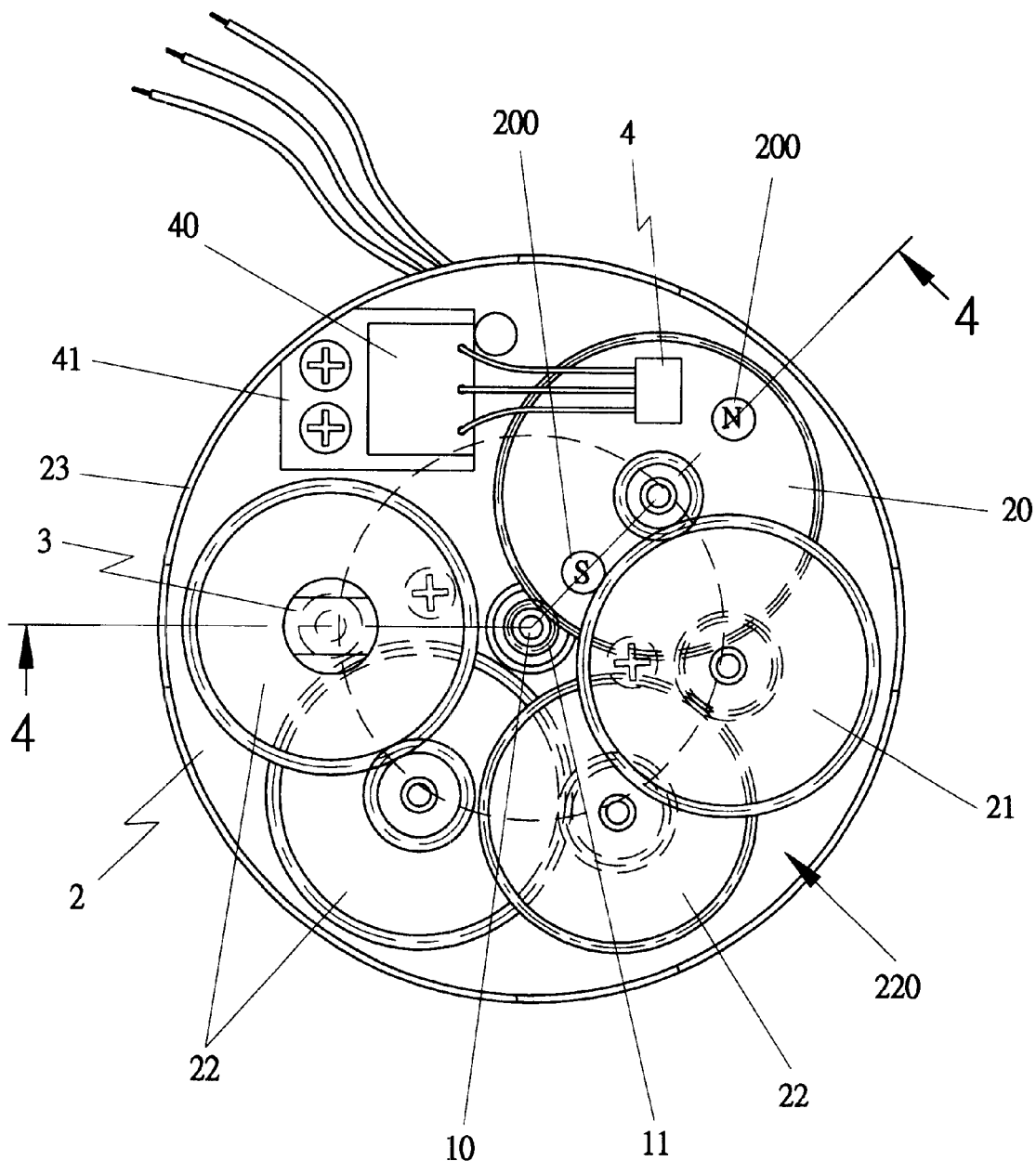
FIG. 3 is a top view of a first embodiment of a device for detecting the rotating speed of a fan motor in the present invention.
Figure 4:
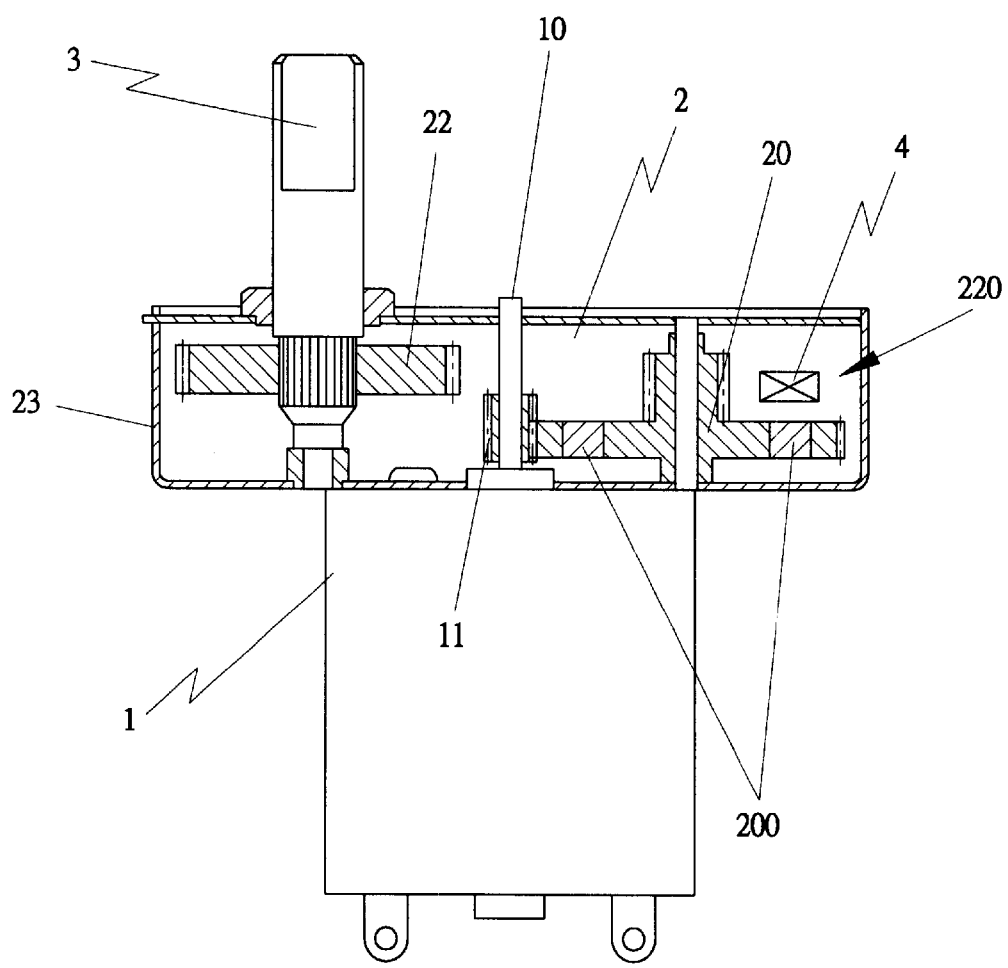
FIG. 4 is a cross-sectional view of the line 4—4 in FIG. 3.

A preferred embodiment of a device for detecting the rotating speed of a fan motor in this invention, as shown in FIGS. 3 and 4, includes a motor 1, a gear case 2 combined together.

The motor 1 has a shaft 10 fixed with a gear 11 engaging with a gear 20 in the gear case 2. The gear case 2 has a case body 23 an interior space 220 for containing plural gears 20, 21 and 22 fitted inside, with the gear 20 and the gear 21 engaging with each other and then the gear 22 connected to a rotating shaft 3 of an electric fan. Further, two permanent magnets 200 respectively provided with an N pole and an S pole are embedded in the gear 20.

Besides, a magnetic inductive element 4 is fixed on a fundamental plate 40 and the fundamental plate 40 together with a base 41 is stably bolted in the case body 23. Thus, the magnetic inductive element 4 can stay above, not on, the gear 20, as shown in FIG. 4, so as to maintain a fixed distance between the magnetic inductive element 4 and the two permanent magnets 200, thus bringing forth the best effect of operation. Further, a hall effect element is the best to serve as the magnetic inductive element 4, which will be reacted to operate by the magnetic field of the N Pole and the S Pole of the permanent magnets 200, so that the rotating speed of the gear 20 can be detected and then the rotating speed of the motor can also be calculated according to the gear proportion between the gear 20 and the gear 11.

Figure 5:
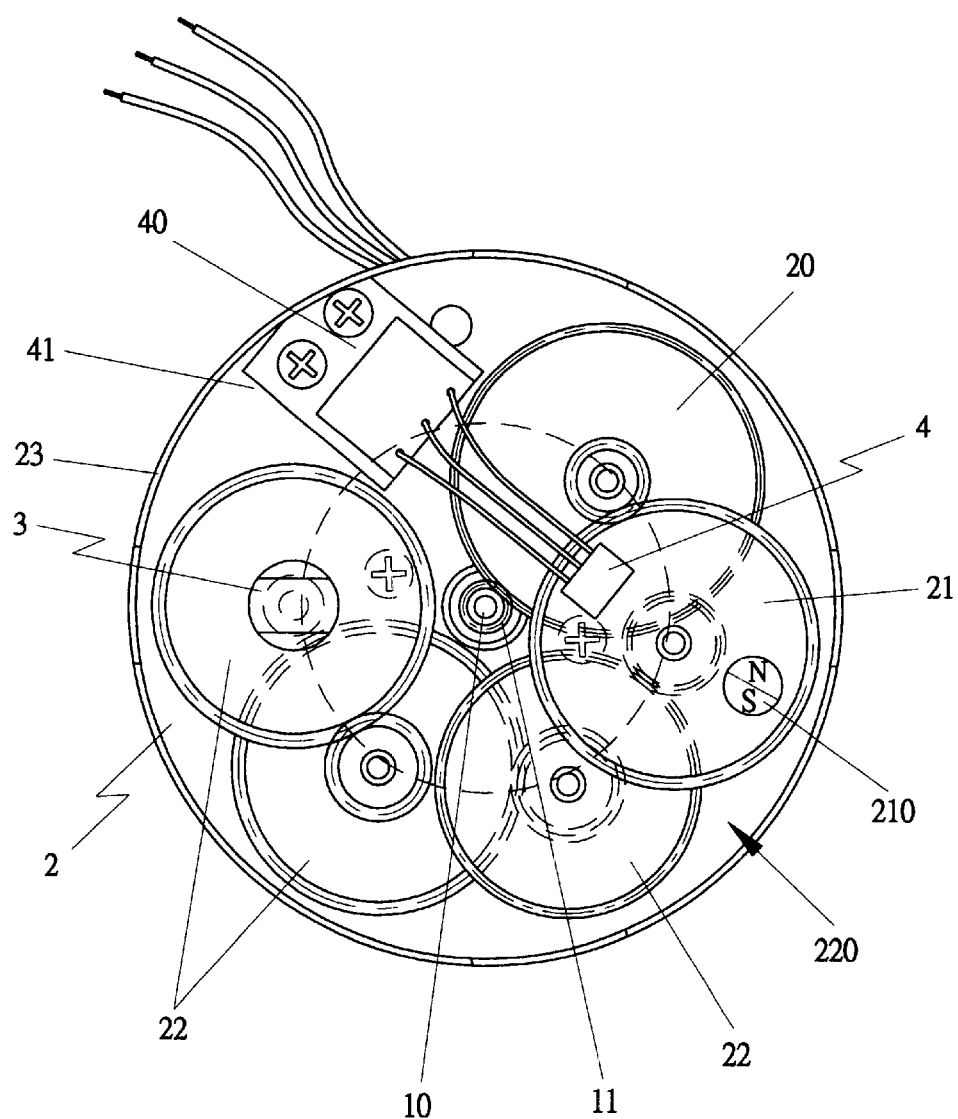
FIG. 5 is a top view of a second embodiment of a device for detecting the rotating speed of a fan motor, with the magnetic inductive element in operating condition in the present invention; and, FIG. 6 is a cross-sectional view and a partially magnified view of a third embodiment of a device for detecting the rotating speed of a fan motor in the present invention.

A second preferred embodiment of a device for detecting the rotating speed of the motor in the present invention shown in FIG. 5, has a permanent magnet 210 having an N Pole and an S Pole embedded in the gear 21 and the magnetic inductive element 4 lies above, not on, the gear 21. Thus, the magnetic inductive element 4 will be in cooperation with the permanent magnet 210 for operating to produce the same effect as that of the first embodiment.

Figure 6:
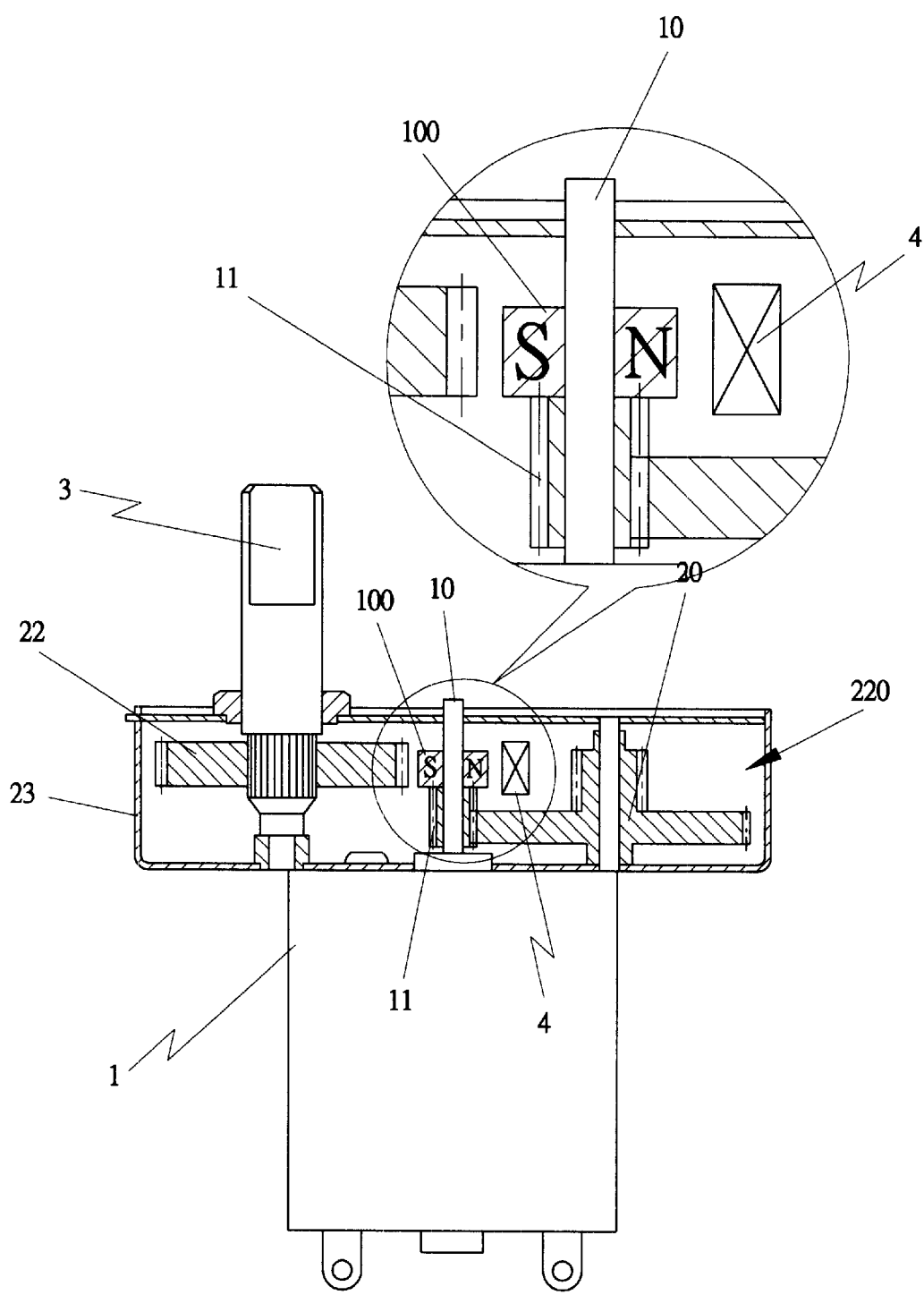

A third preferred embodiment of a device for detecting the rotating speed of a fan motor in the present invention shown in FIG. 6, has a permanent magnet 100 fixed around the shaft 10 of the motor to interact with a magnetic inductive element 4, having the same effect as those of the first and the second embodiments.

As can be understood from the above description, the gear proportion among the gears 20, 21 and 22 engaging with each other in the gear case 2 can be preset depending on practical needs, and the permanent magnet can be embedded either in gear 20 or 21 or 22 so long as it is convenient to be installed.

While the preferred embodiments of the invention have been described above, it will be recognized and understood that various modifications may be made therein and the appended claims are intended to cover all such modifications that may fall within the spirit and scope of the invention.

What is claimed is:

1. A device for detecting the rotating speed of a fan motor, the device comprising a motor and a gear case fixed with said motor, a gear fixed around a shaft of said motor, said gear engaging with one of plural gears contained in an interior space in said gear case, said plural gears in said gear case engaged with one another, with one of said gears therein connected to a rotating shaft of a said fan; and, Two permanent magnets embedded in one of said plural gears in said gear case and a magnetic inductive element fixed on a fundamental plate, said fundamental plate together with a base secured stably in said case body, said magnetic inductive element lying above, said two permanent magnets embedded in one gear of said plural gears in order to maintain a fixed distance between said magnetic inductive element and said two permanent magnets a hall effect element used as said magnetic inductive element and activated by a magnetic field of the N pole and S pole of said two permanent magnets to operate for detecting the rotating speed of the motor.

* * * * *